(12) United States Patent
Soares et al.

(10) Patent No.: US 12,266,106 B1
(45) Date of Patent: Apr. 1, 2025

(54) MACHINE LEARNING-BASED BLOOD FLOW TRACKING

(71) Applicant: Apple Inc., Cupertino, CA (US)

(72) Inventors: Olivier Soares, San Jose, CA (US); Andrew P. Mason, Cottesloe (AU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/519,575

(22) Filed: Nov. 27, 2023

Related U.S. Application Data

(63) Continuation of application No. 16/998,746, filed on Aug. 20, 2020, now Pat. No. 11,830,182.

(60) Provisional application No. 62/889,396, filed on Aug. 20, 2019.

(51) Int. Cl.
*G06T 7/00* (2017.01)
*G06T 13/40* (2011.01)
*G06T 15/04* (2011.01)
*G06T 17/20* (2006.01)

(52) U.S. Cl.
CPC ............ *G06T 7/0012* (2013.01); *G06T 13/40* (2013.01); *G06T 15/04* (2013.01); *G06T 17/20* (2013.01); *G06T 2207/30201* (2013.01)

(58) Field of Classification Search
None
See application file for complete search history.

(56) References Cited

U.S. PATENT DOCUMENTS

| | | |
|---|---|---|
| 6,608,624 B1 | 8/2003 | Wang |
| 10,181,213 B2 | 1/2019 | Bullivant |
| 10,467,803 B1 | 11/2019 | Degtyarev |
| 10,636,192 B1 | 4/2020 | Saragih |
| 10,636,193 B1 | 4/2020 | Sheikh |
| 10,796,476 B1 | 10/2020 | Xing |
| 10,818,038 B2* | 10/2020 | Beeler ............... G06T 15/506 |
| 10,860,838 B1 | 12/2020 | Elahie |
| 11,055,514 B1 | 7/2021 | Cao |
| 11,120,600 B2 | 9/2021 | Stoyles |
| 11,282,255 B2* | 3/2022 | Kuribayashi ........... G06T 13/40 |
| 11,303,850 B2* | 4/2022 | Tong ................. G06F 3/0482 |
| 11,430,169 B2* | 8/2022 | Comer ................ G06F 3/011 |
| 2005/0008209 A1 | 1/2005 | Matsumoto |
| 2010/0257214 A1* | 10/2010 | Bessette ............. G16H 40/63 707/812 |
| 2010/0333017 A1* | 12/2010 | Ortiz ................ G06F 3/0486 715/823 |
| 2014/0035929 A1 | 2/2014 | Matthews |
| 2014/0201126 A1 | 7/2014 | Zadeh |
| 2015/0125049 A1 | 5/2015 | Taigman |

(Continued)

OTHER PUBLICATIONS

"Alotaibi, Sarah and William A. P. Smith, A Biophysical 3D Morphable Model of Face Appearance," 2017 IEEE International Conference on Computer Vision Workshops (ICCVW), Oct. 22-29, 2017.

(Continued)

*Primary Examiner* — Anand P Bhatnagar

(74) *Attorney, Agent, or Firm* — Blank Rome LLP

(57) ABSTRACT

Rendering an avatar may include determining an expression to be represented by an avatar, obtaining a blood texture map associated with the expression, wherein the blood texture map represents an offset of coloration from an albedo map for the expression, and rendering the avatar utilizing the blood texture map.

20 Claims, 8 Drawing Sheets

(56) References Cited

U.S. PATENT DOCUMENTS

| | | | |
|---|---|---|---|
| 2015/0193718 A1 | 7/2015 | Shaburov | |
| 2015/0242461 A1 | 8/2015 | Kung | |
| 2016/0042548 A1 | 2/2016 | Du | |
| 2016/0142767 A1 | 5/2016 | Shigeta | |
| 2016/0180568 A1 | 6/2016 | Bullivant | |
| 2016/0360970 A1 | 12/2016 | Tzvieli | |
| 2017/0069124 A1* | 3/2017 | Tong | G06T 17/20 |
| 2017/0193286 A1 | 7/2017 | Zhou | |
| 2018/0096511 A1 | 4/2018 | Beeler | |
| 2018/0157901 A1* | 6/2018 | Arbatman | H04L 51/10 |
| 2018/0308276 A1* | 10/2018 | Cohen | G06T 15/205 |
| 2018/0336714 A1 | 11/2018 | Stoyles | |
| 2018/0373925 A1 | 12/2018 | Wang | |
| 2019/0172242 A1 | 6/2019 | Bullivant | |
| 2019/0213772 A1* | 7/2019 | Lombardi | G06T 15/04 |
| 2019/0313915 A1 | 10/2019 | Tzvieli | |
| 2020/0082572 A1* | 3/2020 | Beeler | G06T 15/506 |
| 2020/0114925 A1 | 4/2020 | Iwasaki | |
| 2020/0202622 A1 | 6/2020 | Gallo | |
| 2020/0219302 A1* | 7/2020 | Tarquini | G06T 13/40 |
| 2020/0349752 A1* | 11/2020 | Bullivant | G06N 3/004 |
| 2021/0256542 A1 | 8/2021 | McDaniel | |
| 2021/0390767 A1 | 12/2021 | Johnson | |
| 2023/0105458 A1* | 4/2023 | Bullivant | G06N 3/004 |
| | | | 345/473 |

OTHER PUBLICATIONS

Chickerur, Satyadhyan and Kartik Joshi, "3D face model dataset: Automatic detection of facial expressions and emotions for educational environments," Aug. 13, 2015.

Costigan, et al., "Facial Retargeting using Neural Networks," MIG '14 Proceedings of the Seventh International Conference on Motion in Games, Playa Vista, California, Nov. 6-8, 2014.

Dubey, Monika and Prof. Lokesh Singh, "Automatic Emotion Recognition Using Facial Expression: A Review," vol. 3, Issue 2, Feb. 2016.

Garrido, et al., "Corrective 3D Reconstruction of Lips from Monocular Video," ACM Transactions on Graphics, vol. 35, Issue 6, Article 219 Nov. 2016.

Gotardo, "Practical Dynamic Facial Appearance Modeling and Acquisition," ACM Trans. Graph., vol. 37, No. 6, Article 232, Nov. 2018.

Hong, et al., "Real-Time Speech-Driven Face Animation with Expressions Using Neural Networks," IEEE Transactions on Neural Networks, vol. 13, No. 1, Jan. 2002.

Jimenez, et al., "A Practical Appearance Model for Dynamic Facial Color," ACM Transactions on Graphics, vol. 29(5), SIGGRAPH Asia 2010.

Karras, et al., "Audio-Driven Facial Animation by Joint End-to-End Learning of Pose and Emotion," ACM Transactions on Graphics, vol. 36, No. 4, Article 94, Jul. 2017.

Kingma, Diederik P. and Max Welling, "Auto-Encoding Variational Bayes," 2013, CoRR, abs/1312.6114.

Laine, et al., "Facial Performance Capture with Deep Neural Networks," Sep. 21, 2016.

Lombardi, et al., "Deep Appearance Models for Face Rendering," Aug. 1, 2018, arXiv:1808.00362v1.

Mandl, et al., "Learning Lightprobes for Mixed Reality Illumination," 2017 IEEE International Symposium on Mixed and Augmented Reality (ISMAR).

Oyedotun, et al., "Facial Expression Recognition via Joint Deep Learning of RGB-Depth Map Latent Representations," IEEE International Conference on Computer Vision Workshops (ICCVW), Oct. 22-29, 2017.

Savran, et al., "Automatic Detection of Emotion Valence on Faces Using Consumer Depth Cameras," 2013 IEEE International Conference on Computer Vision Workshops, Dec. 2-8, 2013.

Thies, et al., "Deferred Neural Rendering: Image Synthesis using Neural Textures," Apr. 28, 2019, arXiv:1904.12356v1.

Tian, et al., "Recognizing Action Units for Facial Expression Analysis," IEEE Transactions on Pattern Analysis and Machine Intelligence, vol. 23, No. 2, Feb. 2001.

Videla, Lakshmi Sarvani, "Model Based Emotion Detection using Point Clouds," Aug. 3, 2015, Retrieved from the Internet: URL: https://www.slideshare.net/LakshmiSarvani1/model-based-emotion-detection-using-point-clouds [Retrieved on Aug. 9, 2018].

Weber, et al., "Learning to Estimate Indoor Lighting from 3D Objects," 2018 IEEE International Conference on 3D Vision (3DV).

* cited by examiner

MACHINE LEARNING-BASED BLOOD FLOW TRACKING

BACKGROUND

This disclosure relates generally to image processing. More particularly, but not by way of limitation, this disclosure relates to techniques and systems for generating and utilizing a blood flow texture map for rendering an avatar.

Computerized characters that represent and are controlled by users are commonly referred to as avatars. Avatars may take a wide variety of forms including virtual humans, animals, and plant life. Some computer products include avatars with facial expressions that are driven by a user's facial expressions. One use of facially-based avatars is in communication, where a camera and microphone in a first device transmits audio and real-time 2D or 3D avatar of a first user to one or more second users such as other mobile devices, desktop computers, videoconferencing systems and the like. Known existing systems tend to be computationally intensive, requiring high-performance general and graphics processors, and generally do not work well on mobile devices, such as smartphones or computing tablets. Further, existing avatar systems do not generally provide the ability to communicate nuanced facial representations or emotional states.

DETAILED DESCRIPTION

Figure 1:
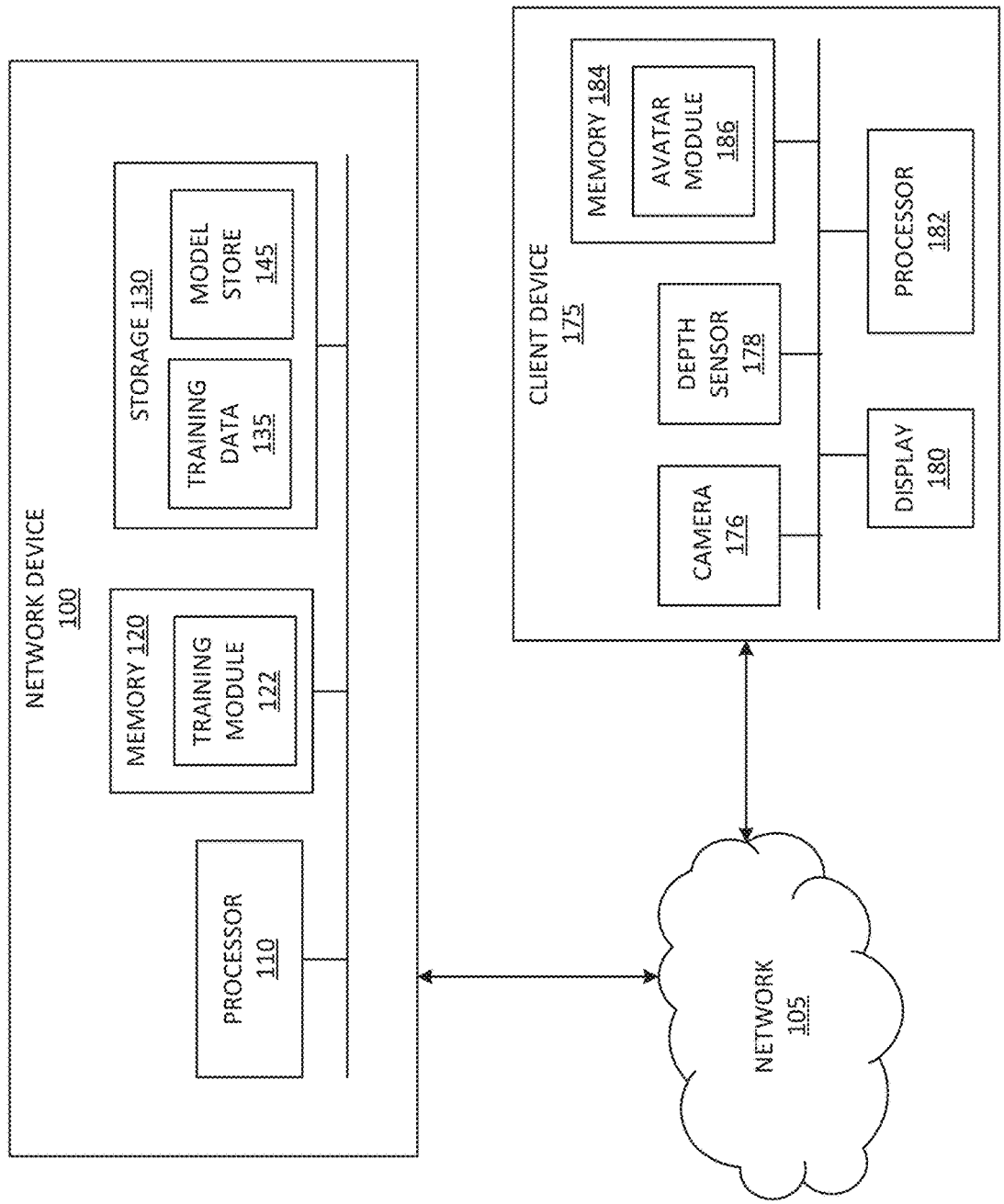
FIG. 1 shows, in block diagram form, a simplified system diagram according to one or more embodiments.

This disclosure pertains to systems, methods, and computer readable media to utilize a machine learning based blood flow tracking technique for generating an avatar. To generate a photorealistic avatar, blood flow can be mimicked based on facial expressions a subject may make. That is, blood moves around a face differently when a person talks or makes different facial expressions, or performs any other movement that deforms the face. As the blood moves, the coloration of the subject's face may change due to the change in blood flow (e.g., where the subject's blood is concentrated under the skin). The process may include a training phase and an application phase.

The first phase involves training a texture autoencoder based on blood flow image data captured using a photogrammetry system. Many images of a subject or subjects are captured making different expressions such that ground truth data can be obtained between an expression and how blood flow appears in the face. Blood flow may be determined by extracting the lighting component as it is displaced from the albedo map. The albedo map describes a texture of a face with perfectly diffused light, and in the static version of a subject's skin. Accordingly, the extracted lighting component indicates the offset from the albedo map for a particular expression. As a result, the texture autoencoder may map a subject's expression to a 2D blood flow texture map. In one or more embodiments, the texture autoencoder may consider as input a series of expressions which results in a particular 2D blood flow texture map.

The second phase involves utilizing the 2D blood texture map to generate an avatar. The avatar may be generated, for example, using a multipass rendering technique in which the 2D blood texture map is rendered as an additional pass during the multipass rendering process. As another example, the blood flow texture for a particular expression may be overlaid on a 3D mesh for a subject based on the 2D blood texture map.

For purposes of this disclosure, an autoencoder refers to a type of artificial neural network used to classify data in an unsupervised manner. The aim of an autoencoder is to learn a representation for a set of data in an optimized form. A trained autoencoder will have an encoder portion, a decoder portion, and latent variables, which represent the optimized representation of the data.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics modeling systems having the benefit of this disclosure.

Referring to FIG. 1, a simplified block diagram of a network device 100 is depicted, communicably connected to a client device 175, in accordance with one or more embodiments of the disclosure. Client device 175 may be part of a multifunctional device, such as a mobile phone, tablet computer, personal digital assistant, portable music/video player, wearable device, base station, laptop computer, desktop computer, network device, or any other electronic device. Network device 100 may represent one or more server devices or other network computing devices within which the various functionality may be contained, or across which the various functionality may be distributed. Network device 100 may be connected to the client device 175 across a network 105. Illustrative networks include, but are not limited to, a local network such as a universal serial bus (USB) network, an organization's local area network, and a wide area network such as the Internet. According to one or more embodiments, network device 100 is utilized to train a model using blood flow texture in order to provide a blood flow texture map. Client device 175 is generally used to generate and/or present an avatar which is rendered in part based on the blood flow texture map. It should be understood that the various components and functionality within network device 100 and client device 175 may be differently distributed across the devices, or may be distributed across additional devices.

Electronic Device 100 may include processor, such as a central processing unit (CPU) 110. Processor 110 may be a system-on-chip such as those found in mobile devices and include one or more dedicated graphics processing units (GPUs). Further processor 110 may include multiple processors of the same or different type. Electronic Device 100 may also include a memory 120. Memory 120 may each include one or more different types of memory, which may be used for performing device functions in conjunction with processor 110. For example, memory 120 may include cache, ROM, RAM, or any kind of transitory or non-transitory computer readable storage medium capable of storing computer readable code. Memory 120 may store various programming modules for execution by processor 110, including training module 122. Electronic device 100 may also include storage 130. Storage 130 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Storage 130 may include training data 135 and model store 145.

Client device 175 may be electronic devices with components similar to those described above with respect to network device 100. Client device 175, may include, for example, a memory 184 and processor 182. Client device 175 may also include one or more cameras 176 or other sensors, such as depth sensor 178, from which depth of a scene may be determined. In one or more embodiments, each of the one or more cameras 176 may be a traditional RGB camera, or a depth camera. Further, cameras 176 may include a stereo- or other multi-camera system, a time-of-flight camera system, or the like which capture images from which depth information of a scene may be determined. Client device 175 may allow a user to interact with computer-generated reality (CGR) environments. There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display device 180 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

According to one or more embodiments, training module 122 may train a model, such as a neural network, based on image data from a single subject or multiple subjects. In one or more embodiment, network device may capture image data of a person or people presenting one or more facial expressions. In one or more embodiments, the image data may be in the form of still images, or video images, such as a series of frames. As a more specific example, the network device may capture ten minutes of data of someone with different facial expressions at 60 frames per second, although various frame rates and lengths of video may be used. The image data may be captured from a camera device that is part of the network device, or that is communicatively coupled to the network device. For example, image data may be received by the network device 100 from a distant source. The image data may be stored, for example, as training data 135 in network device 100.

Upon collecting the training data 135, the training module 122 may extract the facial skin tone and texture of the face captured in each set of training data (e.g., the training data associated with a particular person). According to one or more embodiments, the training module 122 may extract the facial skin tone and texture in the form of a 2D texture map. From the texture map, the blood flow and lighting information may be extracted. Each subject may be associated with an albedo map (e.g., the coloration of the subject's face under perfectly diffused light). The training module 122 may remove the albedo map (e.g., through subtraction or division). The result of the training may be a model that provides the blood flow texture maps. The model or models may be stored in model store 145.

Returning to client device 175, avatar module 186 renders an avatar, for example, depicting a user of client device 175 or a user of a device communicating with client device 175. In one or more embodiments, the avatar module 186 obtains a blood flow texture map from network device 100 and renders the avatar based on the blood flow texture map. The avatar may be rendered according to additional data, such as head pose, lighting condition, and a view vector. According to one or more embodiments, the head pose, lighting condition, and view vector may be determined based on data obtained from camera 176, depth sensor 178, and/or other sensors that are part of client device 175. In one or more embodiments, the avatar module 186 may render the blood flow texture as an additional pass in a multipass rendering technique.

Although electronic device 100 is depicted as comprising the numerous components described above, in one or more embodiments, the various components may be distributed across multiple devices. Particularly, in one or more embodiments, one or more of the training module 122 and avatar module 186 may be distributed differently across the electronic device 100 and the client device 175. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 2:
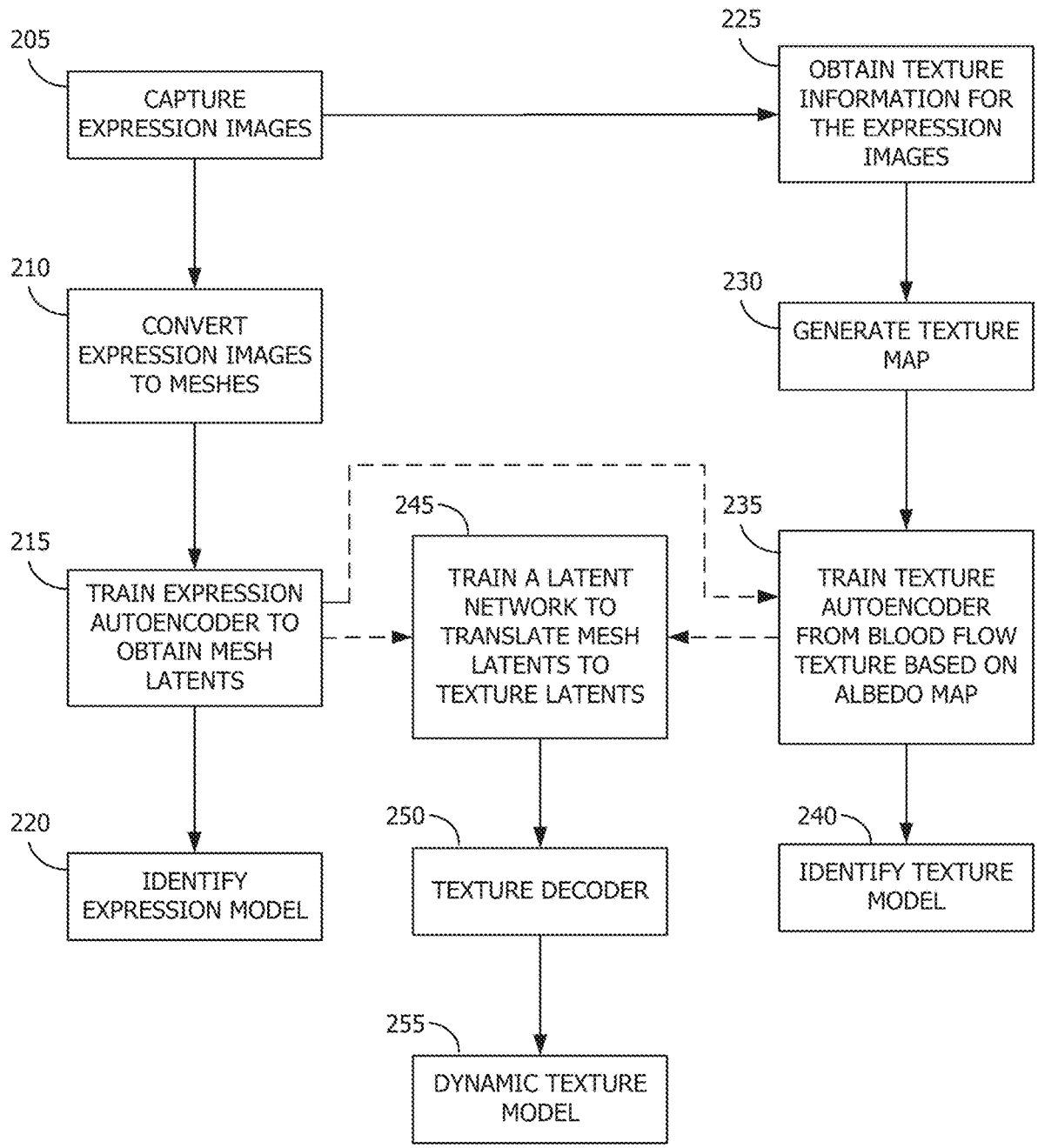
FIG. 2 shows a flowchart in which mesh and texture autoencoders are trained, according to one or more embodiments.

Referring to FIG. 2, a flow diagram is illustrated in which mesh and texture autoencoders are trained from a given sequence. Although the various process depicted in FIG. 2 are illustrated in a particular order, it should be understood that the various processes described may be performed in a different order. Further, not all of the various processes may be necessary to be performed to train the mesh and texture autoencoders.

According to one or more embodiments, the mesh and texture autoencoders may be trained from a series of images of one or more users in which the users are providing a particular expression. As used here, the phrase "expression image" means an image of an individual having a non-neutral expression (e.g., happy, sad, excited, fearful, questioning, etc.). As such, the flowchart begins at 205, where the training module 122 captures or otherwise obtains expression images. In one or more embodiments, the expression images may be captured as a series of frames, such as a video, or may be captured from still images or the like. The expression images may be acquired from numerous individuals, or a single individual. By way of example, images may be obtained via a photogrammetry or stereophotogrammetry system, a laser scanner or an equivalent capture method.

The flowchart continues at 210, where the training module 122 converts the expression images to meshes. Each set of expression images may be converted into an expressive 3D mesh representation using photogrammetry or similar geometry reconstruction method and used to train an expression mesh autoencoder neural network (see block 215). As part of the training process of the expression mesh autoencoder, mesh latents may be obtained. The mesh latents may refer to latent vector values representative of the particular user expression in the image. Particularly, the mesh latent vector is a code that describes to a decoder how to deform a mesh. In one or more embodiments, the image to expression mesh neural network may be trained so that given an image, a latent vector may be estimated.

The flowchart continues at 220, where the training module 122 identifies the expression model. According to one or more embodiments, the expression model may indicate a particular geometry of the user's face in an expressive state. Optionally, in or more embodiments, conditional variables may be applied to the expression model to further refine the model's output. Illustrative conditional variables include, for example, gender, age, body mass index, as well as emotional state. In one or more embodiments, the specific user's expression model may be stored for use during runtime.

Returning to block 205, after the expression images are captured, the flowchart also continues at block 225, where texture information is obtained for the expression images. As will be explained below with respect to FIG. 3, the texture information may be obtained by extracting a lighting component from an albedo map for the facial image. An offset for the lighting may be calculated from the albedo texture map for the facial expression. As such, a texture for the expression image is obtained in relation to the albedo map.

In one or more embodiments, a texture map is generated at block 230 based on the obtained texture information. The texture map may be a 2D blood flow map that indicates a coloration offset from the albedo texture for the subject. Then, at block 235, a texture autoencoder is trained from the blood flow texture and the albedo map. According to one or more embodiments, the latents from the mesh expression autoencoder are used as inputs to a small network that learns to output texture latents for the texture decoder. In one or more embodiments, texture latents may be obtained based on the training of the texture autoencoder. The texture latents may be representative values from a texture latent vector which provides a representation of the blood flow map in vector form. Further, a texture decoder 250 may be obtained in response to training the texture autoencoder. In one or more embodiments, the dynamic texture model 255 can be the "decoder" portion of fully-trained texture autoencoder that has been locked so that its internal node values no longer change or adapt to input.

Returning to block 215, after the expression autoencoder is trained, the flowchart also continues at block 245, where a latent network is trained to translate mesh latents to texture latents. According to one or more embodiments, an expression of a user drives the texture of the user. Said another way, the coloration of a user's face is determined based on the expression. At 245, the training module 122 trains a latent network to translate the mesh latents obtained at 215 to the texture latents obtained at 235. As such, the training module 122 effectively links the mesh encoder to the texture decoder 250. The flowchart concludes at 255, where a dynamic texture model is obtained from the texture decoder. In one or more embodiments, the texture decoder may be utilized as the dynamic texture model, such that the texture model can estimate texture based on mesh latent inputs.

Figure 3:
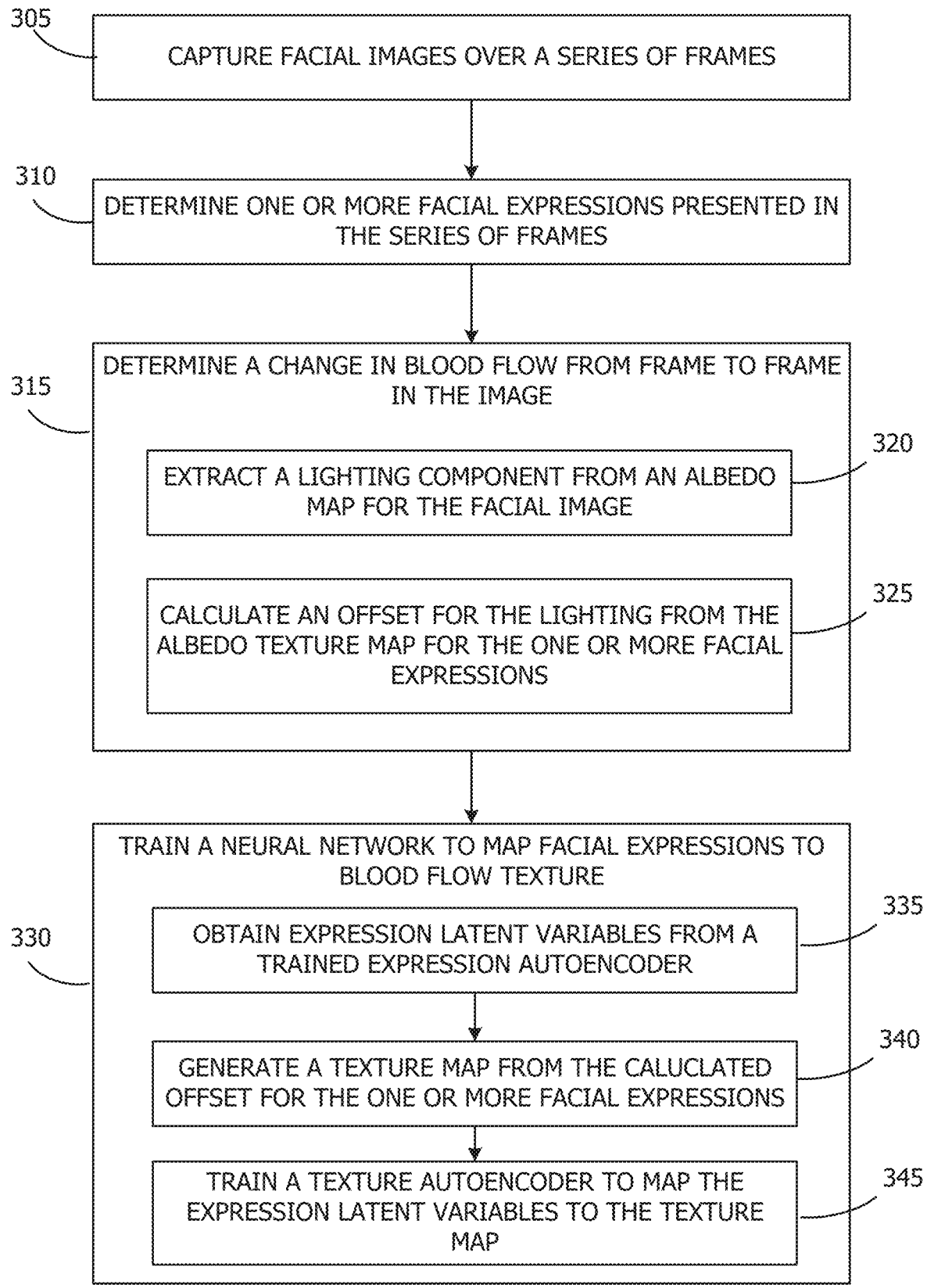
FIG. 3 shows a flowchart in which a neural network is trained to provide a mapping between an expression and a blood flow texture, according to one or more embodiments.

Referring to FIG. 3, a flowchart is depicted in which a neural network is trained to provide a mapping between an expression and a blood flow texture, according to one or more embodiments. The flowchart begins at 305 where the training module 122 captures facial images over a series of frames. The images may be captured, for example, from a photogrammetry system in which multiple cameras are used to capture data of a subject or subjects as they contort their face into different geometries.

At 310, the training module 122 determines one or more facial expressions presented in the series of frames. In one or more embodiments, the facial expressions may be determined by obtaining latent variables associated with the facial geometry. As an example, an expression neural network model may be used which maps expressive image data to a 3D geometry of a representation of the expression. In one or more embodiments, an autoencoder may be trained from image data to map expressions to a 3D geometry of the expressive face. In one or more embodiments, the autoencoder "compresses" the variables in the 3D geometry to a smaller number of latent variables which represent a geometric offset from a user's neutral face. Similarly, according to one or more embodiments, at 310, the training module 122 may identify a particular expression from the latent variables that represent the expression. It should be understood that the term "expression" may refer to any contortion of a face from a neutral face, such as those facial presentations that correspond with emotion, with talking, or with any other movement of the face.

The flowchart continues at 315 where the training module 122 determines a change in blood flow from frame to frame. According to one or more embodiments, a texture autoencoder associated with blood flow may be trained to consider a series of expressions that lead to a final expression, and map the series of expressions to a particular blood flow texture. As such, the following steps may consider a single frame and corresponding expression, or may consider a series of frames and corresponding expressions when mapping the coloration offset.

In one or more embodiments, at 320, the training module 122 extracts a lighting component from an albedo map for the facial image. In one or more embodiment, the albedo map may be ground truth data that is representative of a particular subject's face under perfectly diffused light, and may be represented as a 2D map. According to one or more embodiments, the albedo map may represent a single user, or may represent a community of users. Then at 325, the training module 122 calculates an offset for the lighting from the albedo texture map for the facial expressions. According to one or more embodiments, the offset may be calculated on a point-to-point basis between the 2D albedo map and the corresponding coloration of the user's face. Accordingly, the lighting offset indicates a difference in coloration from the albedo image due to blood flow in the expressive face. The offset may be calculated in linear or log space.

The flowchart concludes at 330 where the training module 122 trains a neural network to map facial expression to the blood flow texture, such as a texture autoencoder. As described above, in one or more embodiments, the facial expression may be represented by latent variables descriptive of the 3D geometry of the face presenting the facial expression. In one or more embodiments, at 335, training module 122 generates a texture map from the calculated offset for the one or more facial expressions. The blood flow texture may be a 2D blood flow map that indicates a coloration offset from the albedo texture for the subject. The trained texture autoencoder and corresponding texture decoder may receive as input image data and/or an indication of the expression (e.g., the latent vector described above), and output the 2D blood flow texture map.

Figure 4:
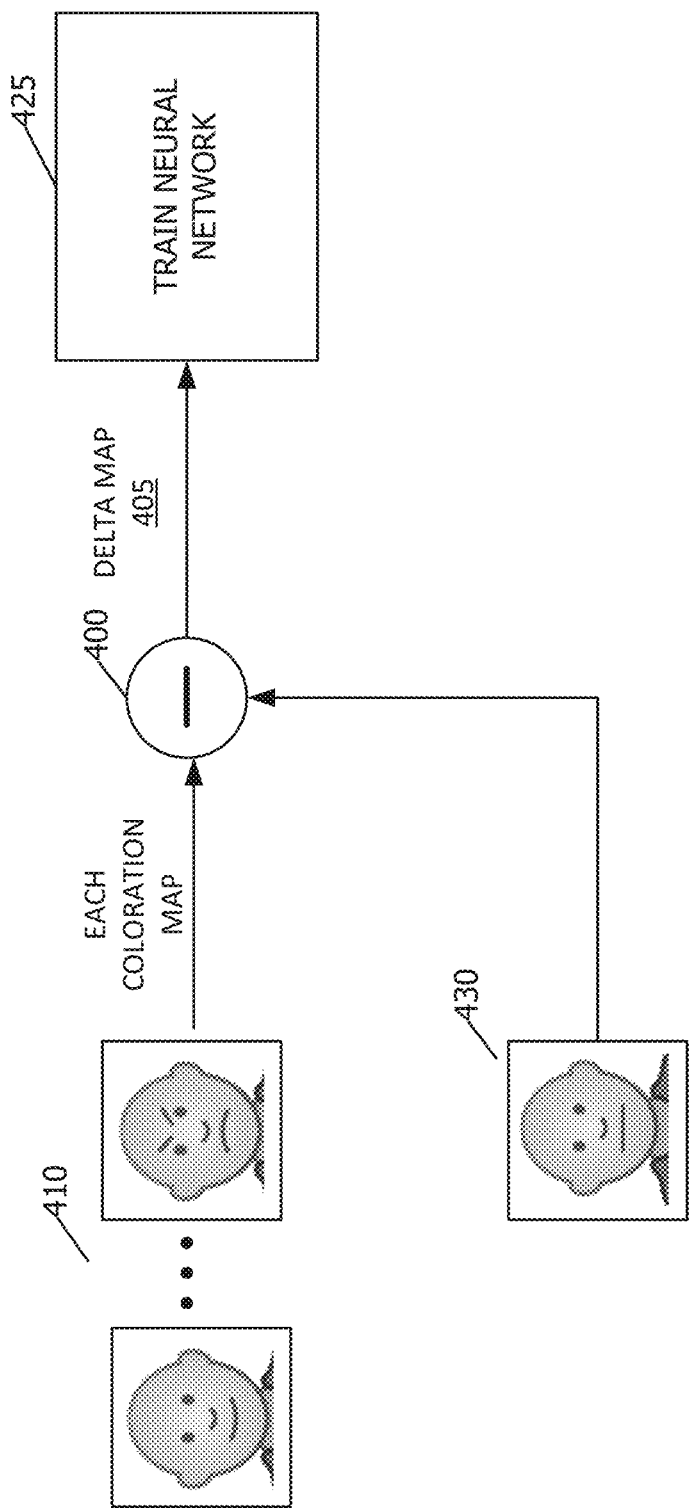
FIG. 4 shows an auto-encoder neural network training operation in accordance with one or more embodiments.

Referring to FIG. 4, in one embodiment the texture autoencoder may be trained with a transformed version of input mesh representations. As shown, albedo map (represented by the neutral face and coloring 430) can be extracted from (e.g., subtracted from) each expression coloration 410 (one at a time) via operator 400 to generate delta map 405. Delta map 405, in turn, may be used to train the texture autoencoder at block 425. In this approach, the texture autoencoder is trained to learn the differences between the albedo map for that identity—and each of the expression colorations 410. As described above, the texture autoencoder 425 may map the differences for a single expression representation, or may be based on a series of expressions that led up to the expression to be rendered. According to one or more embodiments, by utilizing a series of expressions, blood flow may be determined more accurately. That is because blood flows into and out of portions of a face at a certain speed, so it takes some time for blood to end up at the final destination for an expression, even after an expression has remained constant for some time, for example several hundred milliseconds.

Figure 5:
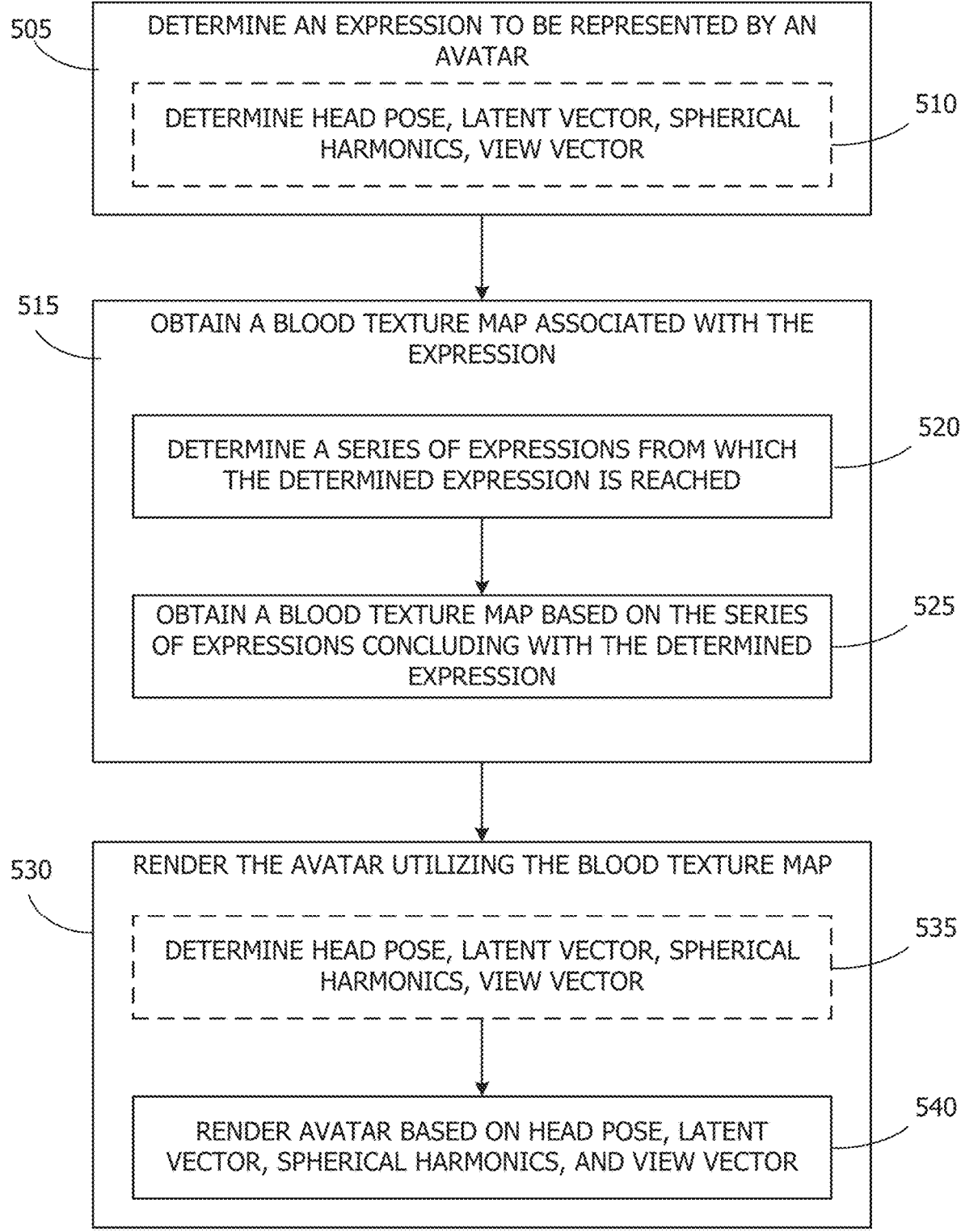
FIG. 5 shows a flowchart illustrating a method for rendering an avatar utilizing a blood texture map, according to one or more embodiments.

Referring to FIG. 5, a flow chart is depicted in which an avatar is rendered utilizing a blood texture map. According to one or more embodiments, the avatar may be rendered by avatar module 186 of client device 175. The avatar may be rendered on the fly, and may be rendered, for example, as part of a gaming environment, a mixed reality application, and the like.

The flowchart begins at 505, in which an expression to be represented by an avatar is determined. At 510, the avatar module 186 optionally determines a head pose, latent vector, spherical harmonics, and view vector in determining an expression to be represented by the avatar.

According to one or more embodiment, the head pose may be obtained based on data received sensors on the client device 175, such as camera 176 or depth sensor 178, or other sensors that are part of or communicably coupled to client device 175. The latent vector may be obtained from an expression model which maps image data to 3D geometric information for a mesh representing the user in the image data. As described above, the latent vector may represent the offset from the geometric information for a neutral expression. Finally, the view vector may indicate a head pose and/or a gaze direction of a user which may impact lighting on the face.

The flowchart continues at 515, in which a blood texture map associated with the expression is obtained. According to one or more embodiments, the blood texture map is output from a texture autoencoder that has been trained to map expressions to a texture overlay indicating an offset from an albedo map for a particular subject for a particular expression. In one or more embodiments, the texture latent vector may be input into the texture autoencoder to obtain the blood texture map for an expression represented by the latent vector.

As described above, in one or more embodiments, the blood texture map may represent color added to a face that corresponds to particular expression, or a series of expressions. Said another way, the blood texture map may depend not only on a current expression, but on an expression or expressions from which the current expression was reached. Thus, optionally, at 520, the avatar module 186 determines a series of expressions from which the determined expression is reached. The series of expressions may be determined from the image data captured by camera 176 of client device 175. Then, at 525, the avatar module 186 obtains a blood texture map based on the series of expressions concluding with the determined expression. As described above, the expressions may be input into the neural network associated with the blood flow map. As another example, the series of expressions may include a plurality of latent vectors which represent the series of expressions. This plurality of mesh latent vectors would be processed using temporal layers in the mesh-latent to texture latent neural network. These temporal layers may be implemented using Temporal Convolutional Networks (TCNs), Long Short Term Memory (LSTM), Gated Recurrent Unit (GRU) or other recurrent neural network layers.

The flow chart continues at 530 where the avatar module 186 renders the avatar utilizing the blood texture map. In one or more embodiments, the blood texture map may be a 2D blood texture map which may be overlaid over a mesh representative of the subject presenting the particular expression. The avatar may be rendered in a number of ways. As an example, the 2D blood texture map may be rendered as an additional pass in a multipass rendering technique. As another example, the avatar may be rendered with the blood texture map comprised in the lighting data that is rendered for the avatar.

Optionally, rendering the avatar may include, at 535, determining a head pose, latent vector, lighting condition, and view vector in determining an expression to be represented by the avatar. As described above, the head pose may be obtained based on data received sensors on the client device 175, such as camera 176 or depth sensor 178, or other sensors that are part of or communicably coupled to client device 175. The latent vector may be obtained from an expression model which maps image data to 3D geometric information for a mesh representing the user in the image data. As described above, the latent vector may represent the offset from the geometric information for a neutral expression. In one or more embodiments, the lighting in the environment may be represented using spherical harmonics. The spherical harmonics may be obtained, for example, from an HDR environment map. The spherical harmonics may be represented in the form of a vector of RBG values that represent a current lighting in the environment. Finally, the view vector may indicate a head pose and/or a gaze direction of the user.

The flowchart also includes, at 540, rendering the avatar based on the head pose, latent vector, spherical harmonics, and view vector. In one or more embodiments, the avatar may be rendered by rendered using a multipass process. In one example, the avatar may be rendered by obtaining a 3D mesh representing the subject presenting the expression and applying the 2D blood texture map to the 3D mesh, which may be obtained based on the latent vector. In one or more embodiments, the avatar may further be rendered to reflect additional characteristics, such as head pose, lighting condition, and view vector.

Figure 6:
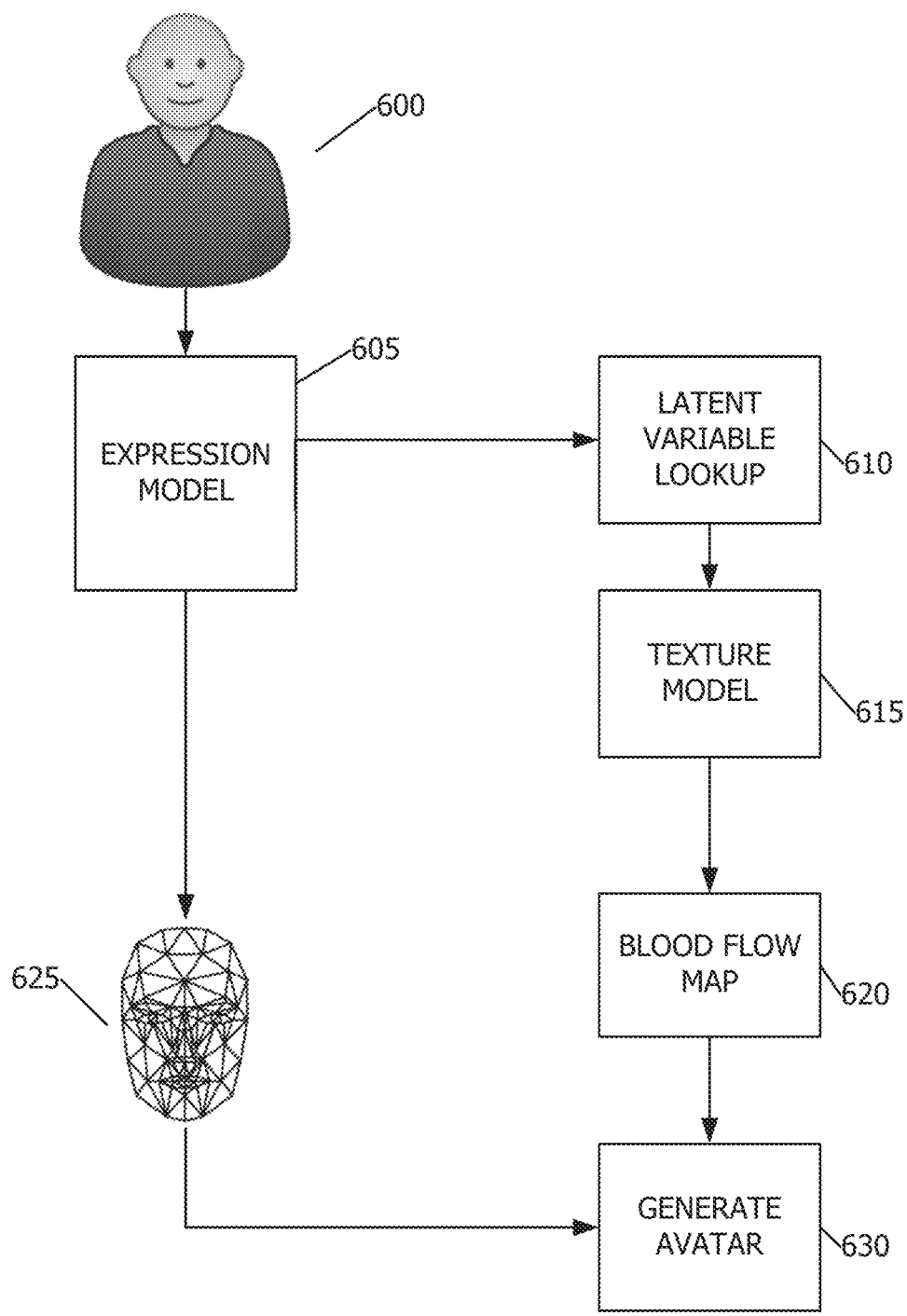
FIG. 6 shows a flow diagram illustrating avatar generation, in accordance with one or more additional embodiments.

FIG. 6 depicts and example flow diagram of generating an avatar utilizing a blood flow map from a trained neural network, such as a texture. The flow diagram begins at 600 where an image of a subject is captured. In one or more embodiments, the image may be captured, for example, by camera 176 of client device 175. The image data 600 may be input into an expression model 605 to determine a geometry of the expression presented on the subject's face in the image data 600. The expression model 605 may be trained by utilizing a set of pairs of data, where each pair includes an image and a latent vector that corresponds to the image. In one or more embodiments, the expression model 605 may be obtained during training of an autoencoder to identify a "compressed" representation of the 3D geometric characteristics of a face based on image data. Because the autoencoder is trained, the autoencoder may assist in obtaining a latent representation from a 3D shape. As such, the mesh autoencoder may provide an encoder that allows input of a mesh and outputs latent values, with a corresponding decoder that takes in latent values as input and outputs meshes. Additionally, a separate image-to-latent encoder may be separately trained using images from the frames of the mesh data set. The image-to-latent encoder may be trained to receive image data as input and output corresponding latent values. According to one or more embodiments, the expression model 605 may include an image-to-latent encoder and a latent-to-mesh decoder.

As such, the latent variables associated with the expression represented in image data 600 may be obtained at 610. Then, at 615, the latent variables may be input into the blood flow neural network model, according to one or more embodiments. As described above, the blood flow neural network model may map the expression (e.g., the latent vector representing the expression) to the 2D blood flow map 620. The flow diagram continues at 630, where the avatar module generates the avatar. According to one or more embodiments, the avatar module renders the avatar by applying the 2D blood flow map 620 to a 3D mesh 625, which may be output from the expression neural network model 605.

In some embodiments, multiple client devices may be interacting with each other in a communication session. Each client device may generate avatars representing users of the other client devices. A recipient device may receive, for example, the blood flow map and the texture map only once, or a limited number of times. The recipient device may receive the maps as a transmission from a sending client device or may acquire them from a network source. The maps may be associated with a user of the sending client device, for example. During the communication session, the sending device may only need to transmit the latent vector representing the expression in order for the recipient device to generate an avatar of the user of the sending device. As such, blood flow information and texture information are not transmitted as a stream of textures during the communication session. Rather, the compact representation of the expression in the form of the expression latents is transmitted during the communication session to allow a recipient device to render the avatar.

Figure 7:
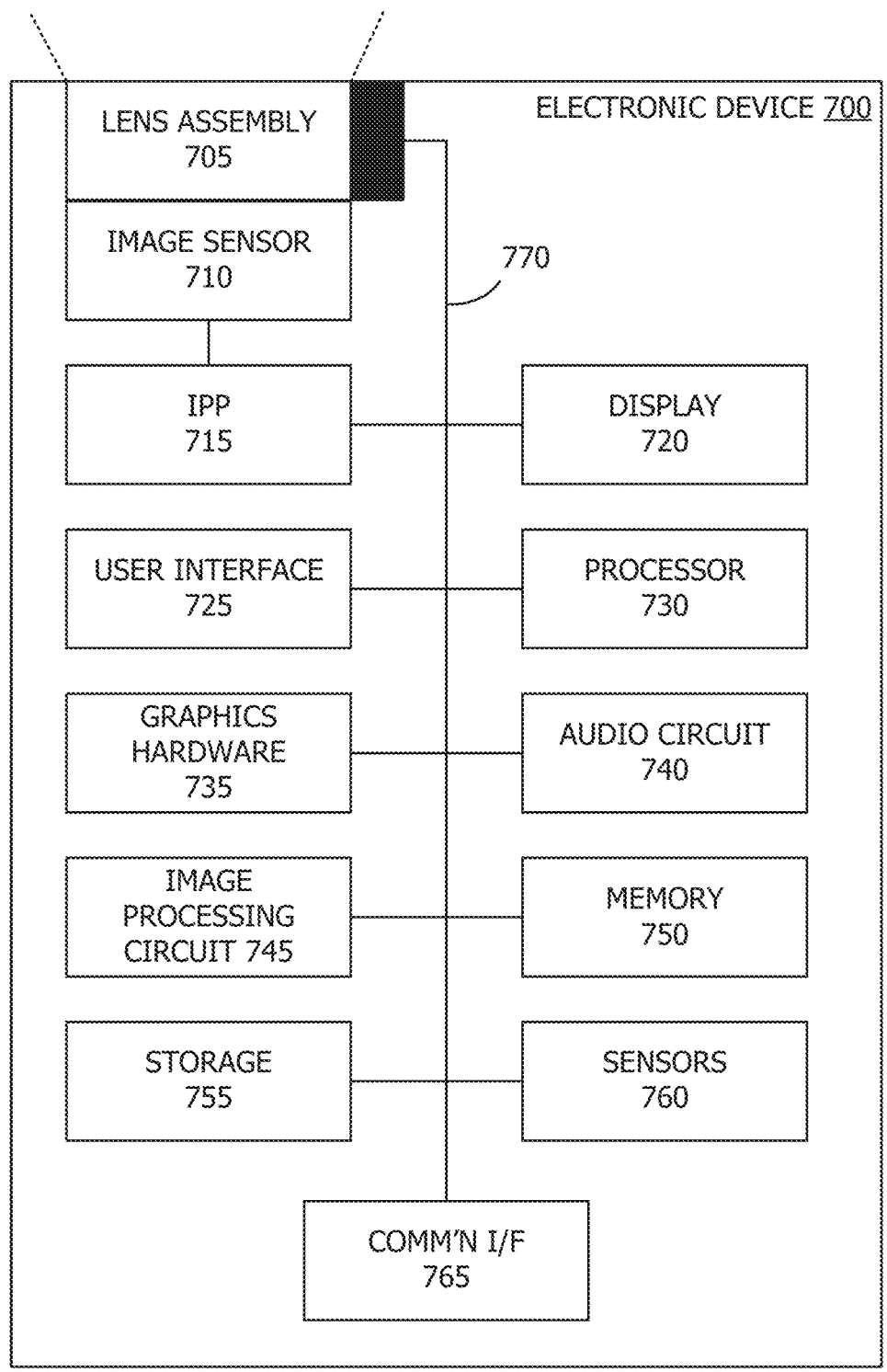
FIG. 7 shows, in block diagram form, a multi-function electronic device in accordance with one or more embodiments.

Referring to FIG. 7, a simplified functional block diagram of illustrative electronic device 700 is shown according to one or more embodiments. Electronic device 700 may be used to acquire user images (e.g., a temporal sequence of image frames) and generate and animate an avatar in accordance with this disclosure. As noted above, illustrative electronic device 700 could be a mobile telephone (aka, a smart-phone), a personal media device or a notebook computer system. As shown, electronic device 700 may include lens assemblies 705 and image sensors 710 for capturing images of a scene (e.g., a user's face), and/or information about a scene (e.g., a depth sensor). By way of example, lens assembly 705 may include a first assembly configured to capture images in a direction away from the device's display 720 (e.g., a rear-facing lens assembly) and a second lens assembly configured to capture images in a direction toward or congruent with the device's display 720 (e.g., a front facing lens assembly). In one embodiment, each lens assembly may have its own sensor (e.g., element 710). In another embodiment, each lens assembly may share a common sensor. In addition, electronic device 700 may include image processing pipeline (IPP) 715, display element 720, user interface 725, processor(s) 730, graphics hardware 735, audio circuit 740, image processing circuit 745, memory 750, storage 755, sensors 760, communication interface 765, and communication network or fabric 770.

Lens assembly 705 may include a single lens or multiple lens, filters, and a physical housing unit (e.g., a barrel). One function of lens assembly 705 is to focus light from a scene onto image sensor 710. Image sensor 710 may, for example, be a CCD (charge-coupled device) or CMOS (complementary metal-oxide semiconductor) imager. IPP 715 may process image sensor output (e.g., RAW image data from sensor 710) to yield an HDR image, image sequence or video sequence. More specifically, IPP 715 may perform a number of different tasks including, but not be limited to, black level removal, de-noising, lens shading correction, white balance adjustment, demosaic operations, and the application of local or global tone curves or maps. IPP 715 may comprise a custom designed integrated circuit, a programmable gate-array, a central processing unit (CPU), a graphical processing unit (GPU), memory, or a combination of these elements (including more than one of any given element). Some functions provided by IPP 715 may be implemented at least in part via software (including firmware). Display element 720 may be used to display text and graphic output as well as receiving user input via user interface 725. In one embodiment, display element 720 may be used to display the avatar of an individual communicating with the user of device 700. Display element 720 may also be a touch-sensitive display screen. User interface 725 can also take a variety of other forms such as a button, keypad, dial, a click wheel, and keyboard. Processor 730 may be a system-on-chip (SOC) such as those found in mobile devices and include one or more dedicated CPUs and one or more GPUs. Processor 730 may be based on reduced instruction-set computer (RISC) or complex instruction-set computer (CISC) architectures or any other suitable architecture and each computing unit may include one or more processing cores. Graphics hardware 735 may be special purpose computational hardware for processing graphics and/or assisting processor 730 perform computational tasks. In one embodiment, graphics hardware 735 may include one or more programmable GPUs each of which may have one or more cores. Audio circuit 740 may include one or more microphones, one or more speakers and one or more audio codecs. Image processing circuit 745 may aid in the capture of still and video images from image sensor 710 and include at least one video codec. Image processing circuit 745 may work in concert with IPP 715, processor 730 and/or graphics hardware 735. Images, once captured, may be stored in memory 750 and/or storage 755. Memory 750 may include one or more different types of media used by IPP 715, processor 730, graphics hardware 735, audio circuit 740, and image processing circuitry 745 to perform device functions. For example, memory 750 may include memory cache, read-only memory (ROM), and/or random access memory (RAM). Storage 755 may store media (e.g., audio, image and video files), computer program instructions or software, preference information, device profile information, pre-generated models, frameworks, and any other suitable data. When executed by processor module 730 and/or graphics hardware 735 such computer program code may implement one or more of the methods described herein (e.g., see FIGS. 1-6). Storage 755 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Device sensors 760 may include, but need not be limited to, one or more of an optical activity sensor, an optical sensor array, an accelerometer, a sound sensor, a barometric sensor, a proximity sensor, an ambient light sensor, a vibration sensor, a gyroscopic sensor, a compass, a magnetometer, a thermistor sensor, an electrostatic sensor, a temperature sensor, and an opacity sensor. Communication interface 765 may be used to connect device 700 to one or more networks. Illustrative networks include, but are not limited to, a local network such as a universal serial bus (USB) network, an organization's local area network, and a wide area network such as the Internet. Communication interface 765 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). Communication network or fabric 770 may be comprised of one or more continuous (as shown) or discontinuous communication links and be formed as a bus network, a communication network, or a fabric comprised of one or more switching devices (e.g., a cross-bar switch).

Figure 8:
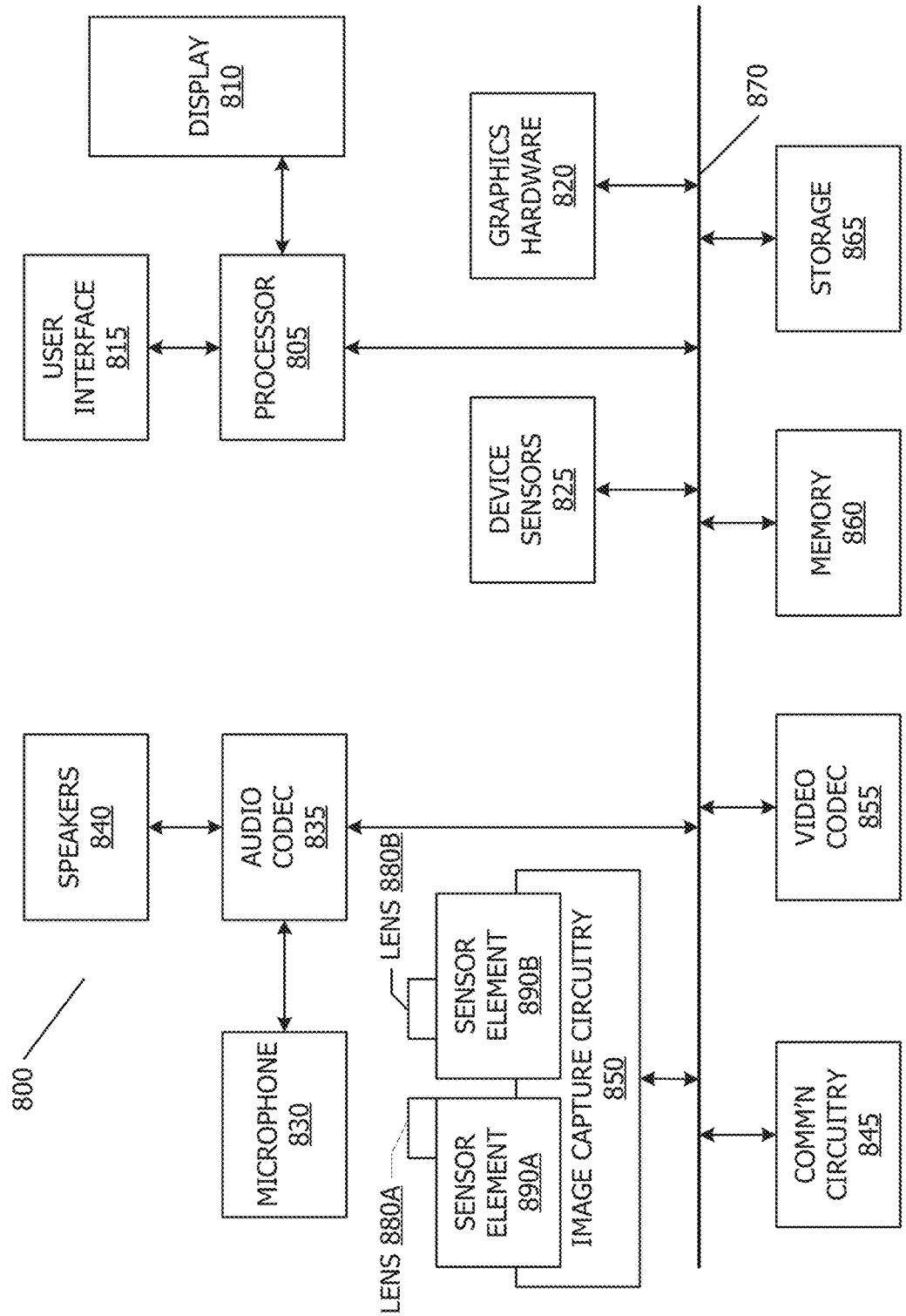
FIG. 8 shows, in block diagram form, a computer system in accordance with one or more embodiments.

Referring now to FIG. 8, a simplified functional block diagram of illustrative multifunction electronic device 800 is shown according to one embodiment. Each of electronic devices may be a multifunctional electronic device, or may have some or all of the described components of a multifunctional electronic device described herein. Multifunction electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, digital image capture circuitry 850 (e.g., including camera system) video codec(s) 855 (e.g., in support of digital image capture unit), memory 860, storage device 865, and communications bus 870. Multifunction electronic device 800 may be, for example, a digital camera or a personal electronic device such as a personal digital assistant (PDA), personal music player, mobile telephone, or a tablet computer.

Processor 805 may execute instructions necessary to carry out or control the operation of many functions performed by device 800 (e.g., such as the generation and/or processing of images as disclosed herein). Processor 805 may, for instance, drive display 810 and receive user input from user interface 815. User interface 815 may allow a user to interact with device 800. For example, user interface 815 can take a variety of forms, such as a button, keypad, dial, a click wheel, keyboard, display screen and/or a touch screen. Processor 805 may also, for example, be a system-on-chip such as those found in mobile devices and include a dedicated graphics processing unit (GPU). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 to process graphics information. In one embodiment, graphics hardware 820 may include a programmable GPU.

Image capture circuitry 850 may include two (or more) lens assemblies 880A and 880B, where each lens assembly may have a separate focal length. For example, lens assembly 880A may have a short focal length relative to the focal length of lens assembly 880B. Each lens assembly may have a separate associated sensor element 890. Alternatively, two or more lens assemblies may share a common sensor element. Image capture circuitry 850 may capture still and/or video images. Output from image capture circuitry 850 may be processed, at least in part, by video codec(s) 855 and/or processor 805 and/or graphics hardware 820, and/or a dedicated image processing unit or pipeline incorporated within circuitry 850. Images captured may be stored in memory 860 and/or storage 865.

Sensor and camera circuitry 850 may capture still and video images that may be processed in accordance with this disclosure, at least in part, by video codec(s) 855 and/or processor 805 and/or graphics hardware 820, and/or a dedicated image processing unit incorporated within circuitry 850. Images so captured may be stored in memory 860 and/or storage 865. Memory 860 may include one or more different types of media used by processor 805 and graphics hardware 820 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to tangibly retain computer program instructions or code organized into one or more modules and written in any desired computer programming language. When executed by, for example, processor 805 such computer program code may implement one or more of the methods described herein.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources to estimate emotion from an image of a face. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to train expression models. Accordingly, use of such personal information data enables users to estimate emotion from an image of a face. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIP4); whereas health data in other countries may be subject to other regulations and policies and should be handled accordingly. Hence different privacy practices should be maintained for different personal data types in each country.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 2-6 or the arrangement of elements shown in FIGS. 1, 7, and 8 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer readable medium comprising computer readable instructions executable by one or more processors to:
   obtain image data of a subject to be represented as an avatar;
   determine an expression of the subject based on the image data; and obtain a representation of an offset of a coloration, wherein the offset of the coloration is associated with the expression, wherein the avatar is rendered using offset of the coloration.

2. The non-transitory computer readable medium of claim 1, wherein the representation of the offset of the coloration corresponds to a lighting component of a face of the subject.

3. The non-transitory computer readable medium of claim 1, wherein the avatar is further rendered based on a geometry of the expression, and wherein the geometry is decoded based on a latent vector describing the geometry.

4. The non-transitory computer readable medium of claim 3, wherein the latent vector is applied to a latent-to-mesh decoder.

5. The non-transitory computer readable medium of claim 3, wherein the geometry comprises a 3D mesh.

6. The non-transitory computer readable medium of claim 1, wherein the avatar is further rendered based on a view vector.

7. The non-transitory computer readable medium of claim 1, wherein the avatar is further rendered based on a lighting component of the environment.

8. A system comprising:
one or more processors; and
one or more computer readable media comprising computer readable instructions executable by the one or more processors to:
obtain image data of a subject to be represented as an avatar;
determine an expression of the subject based on the image data;
obtain a representation of an offset of a coloration, wherein the offset of the coloration is associated with the expression,
wherein the avatar is rendered using offset of the coloration.

9. The system of claim 8, wherein the representation of the offset of the coloration corresponds to a lighting component of a face of the subject.

10. The system of claim 8, wherein the avatar is further rendered based on a geometry of the expression, and wherein the geometry is decoded based on a latent vector describing the geometry.

11. The system of claim 10, wherein the latent vector is applied to a latent-to-mesh decoder.

12. The system of claim 10, wherein the geometry comprises a 3D mesh.

13. The system of claim 8, wherein the avatar is further rendered based on a view vector.

14. The system of claim 8, wherein the avatar is further rendered based on a lighting component of the environment.

15. A method comprising:
obtaining image data of a subject to be represented as an avatar;
determining an expression of the subject based on the image data; and
obtaining a representation of an offset of a coloration, wherein the offset of the coloration is associated with the expression,
wherein the avatar is rendered using offset of the coloration.

16. The method of claim 15, wherein the representation of the offset of the coloration corresponds to a lighting component of a face of the subject.

17. The method of claim 15, wherein the avatar is further rendered based on a geometry of the expression, and wherein the geometry is decoded based on a latent vector describing the geometry.

18. The method of claim 17, wherein the latent vector is applied to a latent-to-mesh decoder.

19. The method of claim 15, wherein the avatar is further rendered based on a view vector.

20. The method of claim 15, wherein the avatar is further rendered based on a lighting component of the environment.

* * * * *